United States Patent

Brichard

[15] 3,645,713
[45] Feb. 29, 1972

[54] PROCESS FOR THE TREATMENT OR PRODUCTION OF FLOATING FLAT GLASS

[72] Inventor: Edgard Brichard, Jumet, Belgium
[73] Assignee: Glaverbel, Watermael-Boitsfort, Belgium
[22] Filed: Oct. 3, 1969
[21] Appl. No.: 863,656

[30] Foreign Application Priority Data
Sept. 5, 1969   Great Britain......................44,046/69

[52] U.S. Cl..............................65/99 A, 65/182 R, 65/356
[51] Int. Cl. ......................................................C03b 18/02
[58] Field of Search....................65/169, 99, 182, 356, 99 A, 65/182 R

[56] References Cited

UNITED STATES PATENTS

| | | | |
|---|---|---|---|
| 3,317,301 | 5/1967 | Robinson | 65/182 X |
| 3,438,761 | 4/1969 | Eloy | 65/182 X |
| 3,520,669 | 7/1970 | Greenler | 65/182 X |

*Primary Examiner*—Arthur D. Kellogg
*Attorney*—Edmund M. Jaskiewicz

[57] ABSTRACT

A float tank used in the production or treatment of flat glass floating on a liquid bath has a refractory floor with passageways formed therein. The passageways communicate with openings in different regions of the tank floor so that the liquid may be circulated between these regions and thereby control or regulate the temperatures within the bath as may be desired.

5 Claims, 6 Drawing Figures

PROCESS FOR THE TREATMENT OR PRODUCTION OF FLOATING FLAT GLASS

The present invention relates to the production or treatment of flat glass floating on a liquid bath, more particularly, to a thermal control system for regulating the temperatures within the bath by the circulation of the bath liquid between different regions of the bath.

In the "float" process of making flat glass it is important to control the distribution of heat within the liquid bath upon which the glass floats. If the temperatures within the bath vary haphazardly it will be impossible to obtain flat glass of good quality and having predetermined properties. One particularly important factor is the temperature gradient along the bath in the direction of movement of the floating glass ribbon. Temperatures within the bath must vary according to a predetermined pattern from that point where the glass is delivered onto the surface of the bath toward the other or discharge end of the bath in order that the glass ribbon will cool and solidify properly as it advances. It is also necessary to maintain the bath temperature substantially uniform along any given transverse section of at least one part of the bath.

It has been proposed to cool the advancing glass ribbon by the action of water-cooled heat exchangers positioned above the bath. However, it has been found that the cooling action of such coolers tended to have a deleterious effect on the glass and led to its deformation.

Water-cooled heat exchangers immersed in the bath have also been used. This arrangement of heat exchangers within the bath has not been particularly satisfactory because of the corrosive action of the bath liquid which is usually molten tin. It is necessary to remove periodically such heat exchangers for replacement so that in practice heat exchangers were positioned in the marginal zones of the bath which were not covered by the glass ribbon. This positioning of the heat exchangers produced transverse temperature gradients which had unfavorable effects on the surface of the glass.

A thermal control system has also been proposed for such float tanks in which the bath liquid is continuously circulated through a heat exchanger. This system produced forced circulation currents between those points at which the liquid was withdrawn and reintroduced into the bath. As a result, the heat distribution within the bath was largely dependent on the location of these points.

It is therefore the principal object of the present invention to provide a novel and improved process and system for the thermal control of a float tank used in the production or treatment of flat glass.

It is another object of the present invention to provide a process and apparatus for controlling the temperature in a region of the bath by circulating bath liquid at appropriate temperature within the tank floor in that region.

The present invention is applicable to making or treating of flat glass in which the glass is floated on a bath of liquid in a float tank and the temperature in the bath is controlled at least partially by recirculating the bath liquid from one region of the bath to another region thereof. According to the present invention there is disclosed a process for the treatment or production of flat glass floating on a bath of liquid within a flat tank having a refractory floor. At least a portion of the liquid is withdrawn from one region of the bath and the withdrawn liquid then introduced into another region of the bath. At least a portion of the withdrawn liquid is circulated through a passageway extending within the refractory floor from one region of the tank to the other region to influence the temperature of the tank floor between these regions.

The present invention may also comprise a thermal control system for a tank used in the production or treatment of flat glass floating on a bath of liquid. The system may comprise means for circulating bath liquid from one region of the bath to another to influence the heat distribution within the bath. The circulating means may comprise a flow path extending at least in part within the tank refractory floor from one region of the bath to the other region.

The invention is applicable not only in the manufacture of flat glass by cooling a ribbon of molten or plastic glass on a bath of liquid but also in a process in which flat glass is treated while floating on a bath of liquid. A particular advantage of the present invention is that by an appropriate distribution of flow passages within the tank floor the heat distribution pattern in the bath can be made to approximate very closely any desired pattern. The circulating bath liquid will influence the temperature along the entire length of its flow path or paths through the tank floor.

This invention is applicable regardless of the composition of the bath liquid. In a specific example of the invention to be described below the bath liquid may be molten tin but the bath liquid may comprise other suitable molten metals or a molten salt.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
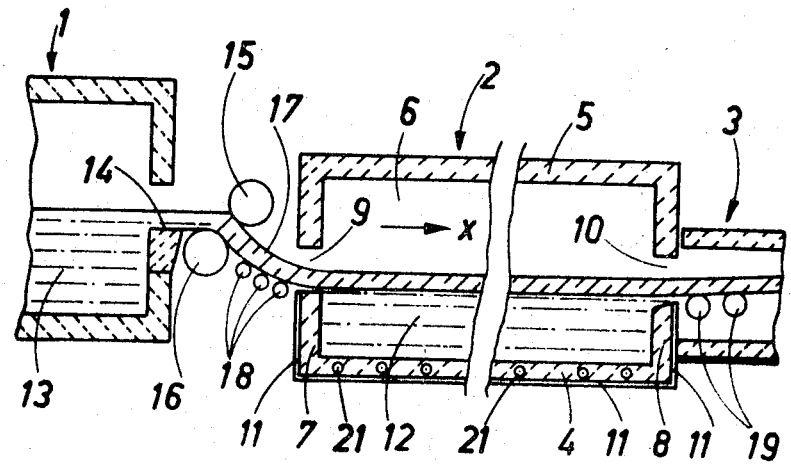
FIG. 1 is a longitudinal vertical sectional view through a float tank and adjacent portions of a melting tank and an annealing lehr.

As may be seen in FIG. 1 the apparatus comprises a melting tank 1, a float tank 2 and an annealing lehr 3. The float tank comprises a bottom wall or floor 4, a crown 5, sidewall 6 and end walls 7,8 spaced from the crown 5 by slots 9,10. These described components of the float tank 2 are made of refractory materials. A metal wall 11 hermetically encloses the floor 4, sidewalls 6, and end walls 7,8 of the tank which contains a bath of molten material 12 which may be molten tin, silver or a molten salt.

The melting tank 1 contains a bath of molten glass 13. Molten glass from this bath is cast over a casting lip 14 between casting rollers 15,16 which shape a glass ribbon 17. The glass ribbon 17 is then conveyed by a series of transporting rollers 18 to the slot 9 of the float tank in which it is deposited on the bath of molten material 12 while continuing to move in the direction indicated by the arrow X. The glass ribbon is fire polished on the bath of molten material 12 and moves toward slot 10 of the float tank from which it is conveyed by rollers 19 to the annealing lehr 3.

Figure 2:
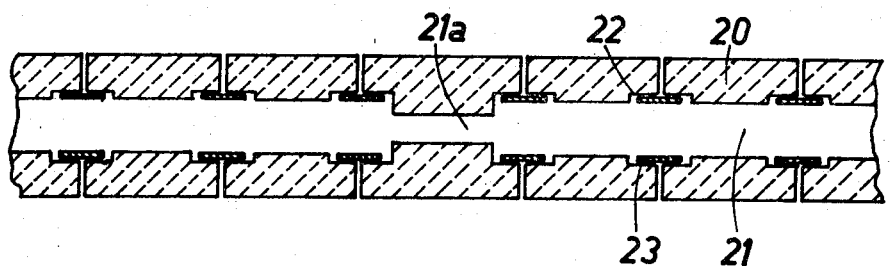
FIG. 2 is a transverse sectional view of a portion of the floor of the float tank of FIG. 1.

The floor 4 of the float tank is formed of a plurality of rows of refractory blocks 20 extending transversely of the tank and a portion of one such row of blocks is shown in FIG. 2. Each block within the row is formed with a through bore with the bores of the assembled blocks being aligned so as to constitute a passageway 21 through which liquid withdrawn from the bath 12 can flow from one region of the tank to another within the refractory floor. Each end of a block bore is provided with an enlarged opening to form an annular recess 22. Between successive blocks a sealing ring 23 is received within the annular recess formed by the cooperating enlarged openings so as to overlap and thus seal the joint between the blocks. One block 20 of the row of blocks shown in FIG. 2 is provided with a smaller diameter bore so as to form a constriction 21a in order to provide a nonuniform thermal conditioning effect along the passageway 21. With this arrangement the resistance to heat exchange between the liquid in the passageway 21 and the bath liquid in the tank is very small. Heat-insulating refractory material such as refractory heat-insulating blocks can be mounted between the carbon refractory blocks 20 and the exterior of the tank.

Figure 3:
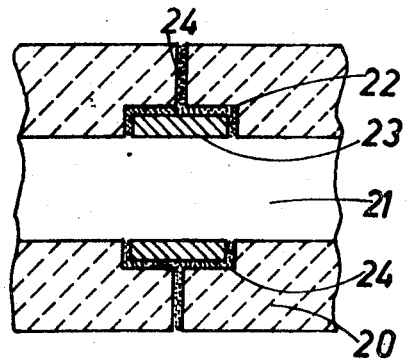
FIG. 3 is a portion of the sectional view of FIG. 2 but in enlarged scale and showing a floor joint in greater detail.

As may be seen in FIG. 3 the sealing of the joints between successive blocks 20 may be improved by the use of finely divided substance 24, such as carbon powder. Such powder may also be used between the blocks and the interposed sealing ring 23. This finely divided material may also be used to prevent bath liquid from flowing downwardly between adjacent transverse rows of blocks.

As the glass ribbon 17 is advanced along the surface of the bath 12, quantities of bath liquid are continuously withdrawn from the bath at positions in the sidewalls of the float tank and recirculated to other regions of the bath through selected one of passageways 21 extending transversely across the tank within the refractory floor. It is possible for the liquid to circulate by thermal siphon effect because of the temperature differential between different regions of the bath. However, one or more pumps may be provided for positively circulating the thermal conditioning liquid through the tank floor.

The positions at which the liquid is withdrawn from and reintroduced to the bath and the positions at which the circulating liquid flows through the tank floor are selected to achieve a predetermined thermal control effect. It is apparent that the heat exchange between the circulating medium and the bath is determined by the location of the circulating liquid within the tank floor. The passageways 21 may extend through every transverse row of floor blocks over the entire width of the tank. This arrangement is particularly flexible because different passageways can be employed at different times to obtain different thermal control. Suitable conduits are provided for connecting the outlet and inlet in the tank walls to the appropriate passageway 21. It is not necessary for all of the floor blocks to have bores therein.

Figure 4:
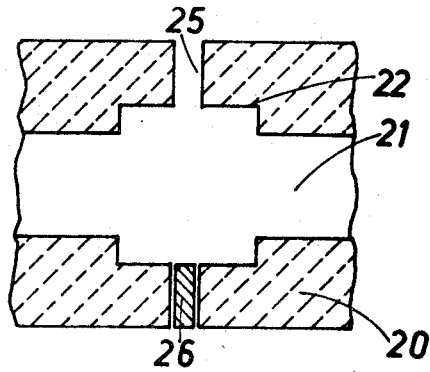
FIG. 4 is a view similar to that of FIG. 3 and illustrates another form of floor joint.

It is also possible to withdraw liquid from the bath at selected positions within the floor area. Certain ones of the blocks 20 may be formed with bores extending from the top faces of the blocks to the passageway 21. It is also possible to withdraw bath liquid by spacing adjacent blocks apart as shown FIG. 4 to provide a slot 25 through which bath liquid can drain into the passageway 21. Spacing strips 26 may then be sandwiched between adjacent blocks below the level of passageways 21 to maintain the blocks at the appropriate spacing. These described blocks and openings in or between top faces of the floor blocks can be used also to reintroduce bath liquid back into the tank. It is also possible to withdraw and/or reintroduce liquid into the tank through components of the tank other than the floor.

Figure 5:
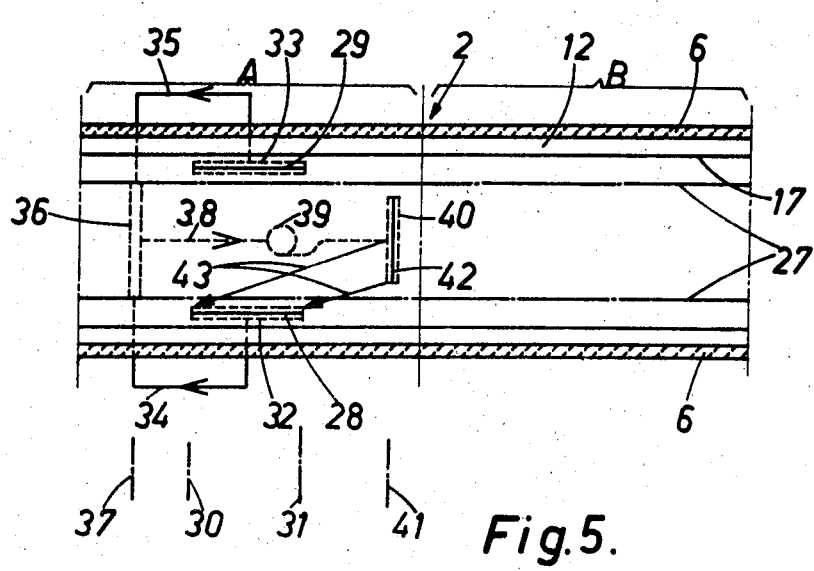
FIG. 5 is a top plan view of a portion of a float tank showing schematically a thermal conditioning system.

Proceeding next to FIG. 5 there is shown a portion of a glass ribbon 17 floating on a molten tin bath 12 in the float tank 2. At the sides of the bath 12 there are "edge zones" in which the temperature tends to be lower than in the central portions of the tank width. The vertical boundary planes of a central region of the tank where the temperature is at a more or less uniform level is designated by the longitudinal lines 27. In normal operation it is necessary to supply heat to the "edge zones" located outwardly of the lines 27 in order to reduce the transverse temperature gradient in the bath.

The floor of the tank is provided with narrow longitudinal slots 28 and 29 for withdrawing molten tin from the "edge zones" of the bath at a particular region along the tank. These slots extend over a portion of the tank length defined by the transverse lines 30,31. The slots 28,29 communicate with passages 32,33 respectively within the refractory bottom blocks of the tank. The passageways 32,33 are connected by conduits 34,35 to opposite ends of a passageway 36 extending transversely within the refractory floor at a position indicated by the transverse line 37. Passageway 36 does not extend over the full width of the tank but only over the central zone between the boundary planes 27. In the drawing, the conduits positioned externally of the tank are shown by solid lines and passageways within the refractory floor of the tank are shown by double broken lines. Preferably the external conduits, such as 34,35, are heat insulated.

The central portion of passageway 36 is connected by an external conduit 38 having therein a pump 39 to the central region of a transverse passageway 40 within the refractory floor of the tank at a position along the tank indicated by the transverse line 41 which is downstream from the slots 28,29. The passageway 40 extends over the greater portion of the width of the central region between the boundary planes 27. The passageway 40 communicates with the interior of the tank through a slot 44 in the floor of the tank.

When the pump 39 is operating, molten metal at a temperature T2B is withdrawn from the two edge zones of the bath through the slots 28,29 and passageways 32,33 and is heated to temperature TA as this liquid flows along passageway 36 in heat exchange relation with the bath 12. This heat exchange cools the central region of the bath at the position indicated by the transverse line 37 so that the temperature at this region is lowered from T1C to a temperature T1'C which nearer to the temperature T1B which prevails in the edge zones at that position along the tank. The molten metal leaving passageway 36 enters passageway 40 where by heat exchange the temperature of the central region of the bath at transverse line 41 is reduced from T3'C to a temperature T3C which is nearer to the temperature T3B which prevails in the edge zones at the corresponding position along the tank.

The circulating molten metal flows continuously from passageway 40 back into the bath through transverse slot 42. This circulation of molten metal induces return currents in the bath indicated by the arrows 43. These currents are directed from the slot 42 to the withdrawal slots 28,29 and induce a flow of relatively hot molten metal from the central zone at position 41, where the metal has a temperature T3C, to edge zones in the vicinity of the slots 28,29 where the temperature T2B of the bath increases to a temperature which is nearer to the temperature T2C existing at the central region of the bath at the corresponding position along the tank. This circulation of molten metal thus has the effect of reducing the transverse temperature gradient in the bath over the entire section A of the tank. Such a thermal conditioning system can also be employed for similar thermal control in some other section of the tank, such as the section B.

Figure 6:
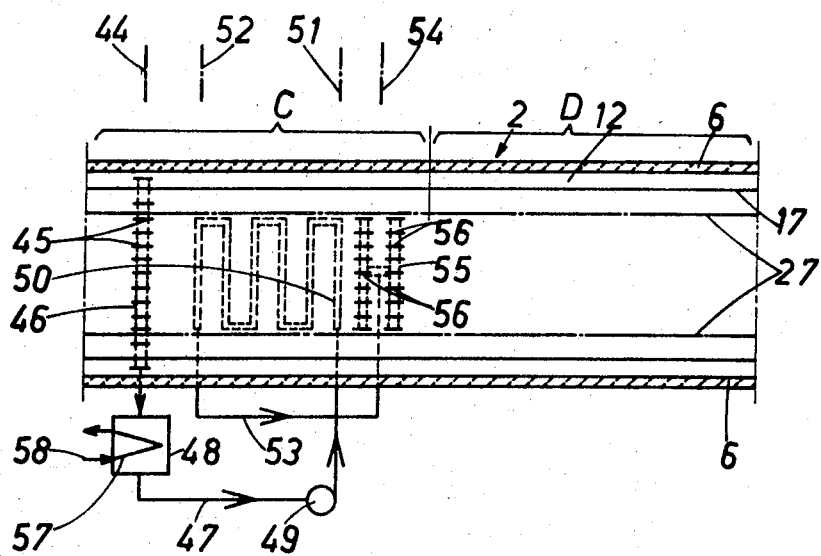
FIG. 6 is a view similar to that of FIG. 5 and showing another form of a thermal conditioning system.

In FIG. 6 there is illustrated a system for controlling a thermal temperature gradient in the longitudinal direction of a float tank. The refractory floor of the tank 2 has a series of liquid withdrawal slots 45 spaced across the width of the tank at the position indicated by the transverse line 44. The liquid which is withdrawn from the bath through the slots 45 flows into a passageway 46 formed within the refractory floor of the tank. Passageway 46 is connected to an exterior conduit 47 having a cooler 48 and a pump 49 and to one end of a passageway 50 defined within the refractory floor of the tank. The passageway 50 comprises a series of reverse bends and defines a winding flow path back and forth across the longitudinal central region of the tank in the section of the tank length bounded by the transverse lines 51,52. The other end of passageway 50 is connected by an external conduit 53 to the central portion of a passageway 55 which has an H-shape in plan and formed within the refractory floor of the tank at a position indicated by the transverse line 54. The passageway 55 extends over the width of the longitudinal central region of the tank and communicates with the interior of the tank by a series of slots 56. The cooler 48 may comprise an internal cooling tube 57 through which is circulated water supplied at 58. The cooler is of the type which is preferably regulated by an adjustment of the proportion of water circulating through tube 57 which is in contact with the circulating molten metal. If a system similar to that illustrated in FIG. 6 is to be used in any section of the tank where the withdrawn molten metal must be heated before being reintroduced into the tank, then a heater is substituted for the cooler 48.

The action of the pump 59 draws molten metal upstream to the withdrawal slots 45 from cooler regions of the bath located downstream from the slots. The molten metal thus imparts a cooling action on the bath at the position along the transverse line 44. The circulating molten metal also imparts a cooling action on the central region of the bath between the transverse lines 51 and 52 and counters the tendency for the bath temperature to rise in the downstream direction due to heat transfer from the floating glass ribbon 17. At tank position 54, the central region of the bath is cooled by the continuous flow of cooler molten metal into the bath through the slots 56. It is preferable to avoid too drastic or too abrupt cooling action on the glass ribbon 17. In the system illustrated in FIG. 6 cooling is restricted because of the progressive reheating of the circulating molten metal which occurs because of the heat exchange with the bath during flow of the circulating metal through the passageway 50 in the refractory floor of the tank. This system operates primarily to control the longitudinal temperature gradient and secondarily to minimize transverse temperature gradients throughout section C of the bath. In addition to this system or in place of it a similar thermal conditioning system can be used for cooling or heating other zones of the tank such as section D.

In the system of FIG. 6 the heat exchanger was positioned externally of the tank, however, it is also possible to provide one or more heat exchangers within the passageways in the tank floor. It must be born in mind that a heat exchanger is not necessary for useful thermal control. Merely by flowing bath liquid along the interior of the tank floor under a cooler region of the bath heat can be transferred to that cooler region from the liquid as it flows through the floor. The present invention also contemplates circulating the bath liquid simultaneously in separate or linked circuits, controlling the relative proportions of liquid flowing in different circuits or branches of different circuits or mixing the quantities of liquid in the different circuits in the controlled proportions.

The passageways along the tank floor may be formed by conduits imbedded in the refractory material of the floor. The floor may be formed by a monolithic cast refractory mass but it is preferable to form the floor of assembled refractory blocks wherein the conduits are formed in sections and joined end to end when the blocks are assembled. The conduit sections can be sealed together by interposing sealing rings between adjacent blocks. The passageways circulating bath liquid can also be defined directly by the refractory floor material by casting the floor or the prefabricated blocks with bores at appropriate positions. The floor is then formed of refractory blocks assembled so that the bores of adjacent blocks are aligned to form a passageway for the liquid. The passageways for flowing the circulating liquid along the interior of the floor may vary in cross-sectional dimensions from one place to another along their length in order to modulate the heat exchange effect as may be desired.

The capacity of the circuit for the circulating bath liquid with respect to the capacity of the tank will determine the frequency with which the entire bath can be thermally reconditioned when one or more heat exchangers are provided for that purpose.

The thermal conditioning of the bath liquid may occur in conjunction with some other conditioning treatment, either physical or chemical, such as filtration, deoxidation or alloying. Appropriate structure for this purpose as known in the art may be incorporated in the circuit for the circulating bath liquid.

It will be understood that this invention is susceptible to modification in order to adapt it to different usages and conditions.

What is claimed is:

1. In a process of producing float glass comprising floating the glass on a liquid bath within a float tank having a refractory floor, the steps of controlling the distribution of heat within the liquid bath upon which the glass floats by withdrawing at least a portion of the liquid from one region of the bath and reintroducing the withdrawn liquid into another region thereof, and the step of circulating within the refractory floor between one region of the tank and another at least a portion of the withdrawn liquid to control or equalize the temperature and heat distribution of the liquid bath between these regions.

2. In a process as claimed in claim 1 and the steps of modifying the temperature of at least a portion of the withdrawn liquid externally of the float tank before reintroducing the withdrawn liquid into the bath.

3. In a process as claimed in claim 1 wherein the withdrawn liquid is flowed in heat exchange relationship to a central region of the tank floor to decrease the temperature of the bath in the central region so that the temperature of the bath in that central region is maintained closer to the temperature of the regions laterally of said central region.

4. In a process as claimed in claim 1 wherein the glass is floated and cooled from a plastic condition on the liquid bath, the bath being a molten metal or molten metal salt.

5. In a process as claimed in claim 1 wherein the bath is of molten tin.

* * * * *